June 30, 1936.   E. FRANKLAND   2,045,593
VEHICLE BRAKE MECHANISM
Filed July 23, 1929   2 Sheets-Sheet 1

INVENTOR
Edwin Frankland
BY
Parker & Burton
ATTORNEYS

June 30, 1936.  E. FRANKLAND  2,045,593

VEHICLE BRAKE MECHANISM

Filed July 23, 1929  2 Sheets-Sheet 2

INVENTOR
Edwin Frankland

BY Parker & Burton

ATTORNEYS

Patented June 30, 1936

2,045,593

UNITED STATES PATENT OFFICE 2,045,593

VEHICLE BRAKE MECHANISM

Edwin Frankland, Detroit, Mich., assignor to Bendix Brake Company, South Bend, Ind., a corporation of Illinois Application July 23, 1929, Serial No. 380,372

24 Claims. (Cl. 188—72)

This invention relates to vehicle wheel brakes, and particularly to wheel brakes of the laterally acting or disk type.

An object of the invention is to provide for operatively engaging two disk members of a brake by mounting one thereof fast upon a sleeve slidable toward the other and held from rotation, and rotating a second sleeve screw-threadedly engaging the first mentioned sleeve.

Another object is to adapt a pair of non-rotative disk braking members for opposite actuation by forming said members with radially spaced coaxial sleeves, and screw-threadedly engaging said sleeves by a third sleeve rotatively actuable between the two first-mentioned sleeves.

A further object is to adapt said actuating sleeve for ready adjustment in the direction of its axis.

These and various other objects the invention attains by the construction hereinafter described and illustrated in the accompanying drawings, wherein:

Fig. 4 is a cross-sectional view taken on the line 4—4 of Fig. 1.

Figure 1:
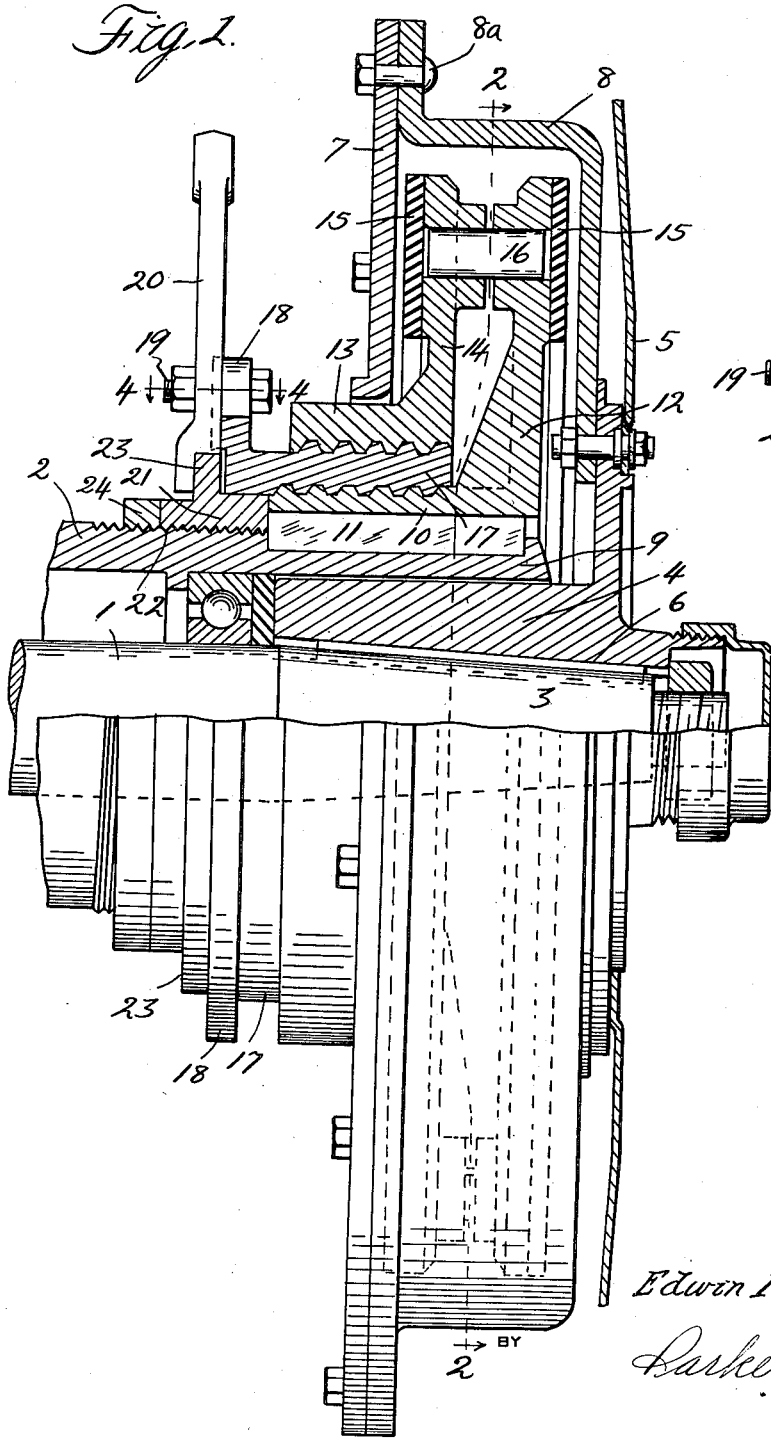
Fig. 1 is an elevational view, partially in section, showing the improved brake associated with a rear wheel and axle.
Figure 2:
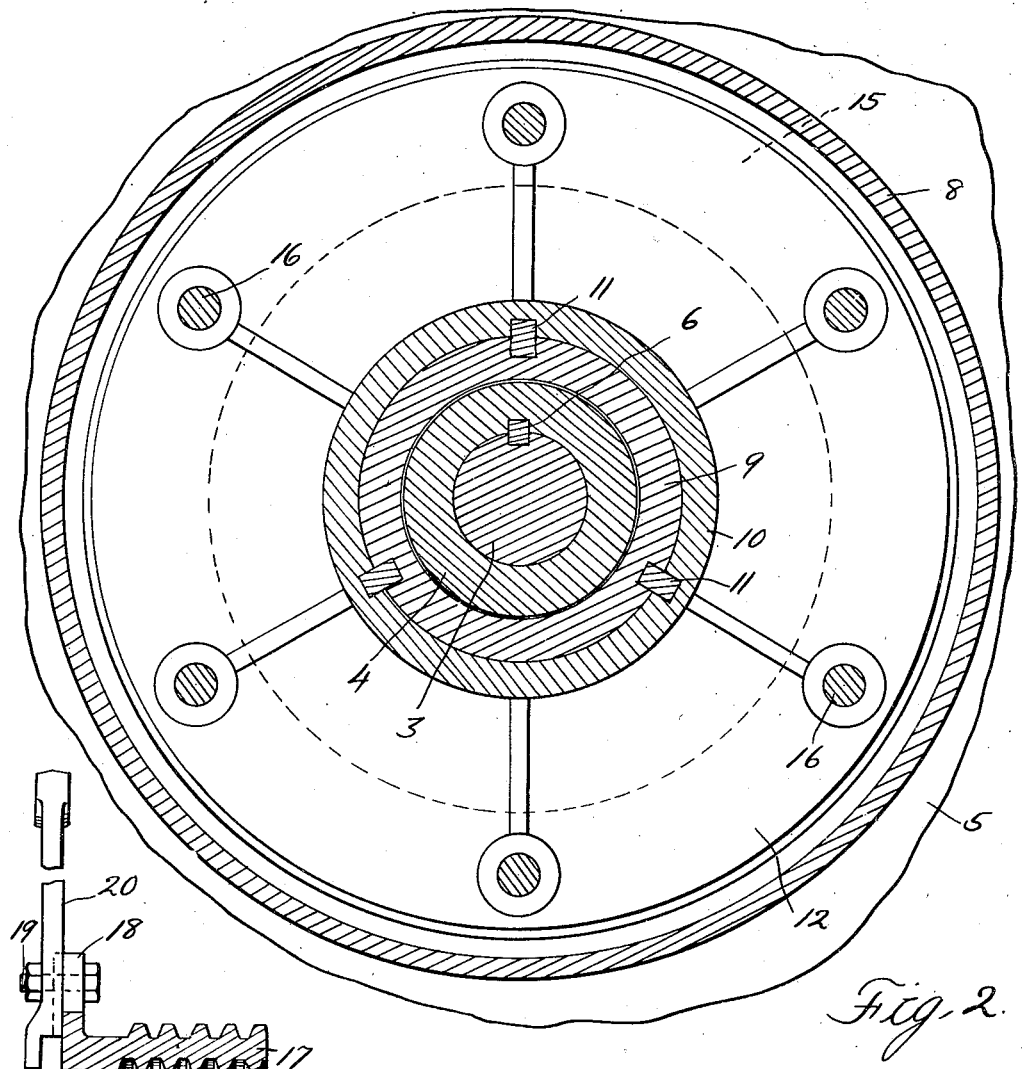
Fig. 2 is a vertical sectional view of the same taken upon the line 2—2 of Fig. 1.
Figure 3:
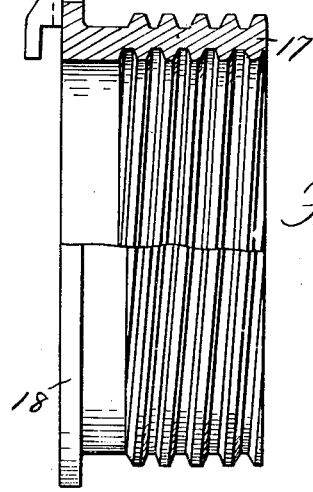
Fig. 3 is a detail view in side elevation and partial section of the actuating sleeve of the brake.

In these views, the reference character 1 designates the rear live axle of a motor vehicle, and 2 the usual tubular housing of said axle. The latter has the usual terminal tapered spindle 3, engaging the hub 4 of a wheel 5, keyed to said spindle as indicated at 6.

Said wheel rigidly carries a brake drum comprising inner and outer parts 7 and 8, the latter having a peripheral wall, and said parts being suitably rigidly connected, as by bolts 8a.

An end portion 9 of the housing 2 projects into said drum, and has a sleeve 10 slidably splined thereon, as indicated at 11. Said sleeve is integrally formed with a disk braking member 12 frictionally coacting with the drum part 8, and outwardly spaced from said sleeve is a second sleeve 13, integrally formed with a disk brake member 14, for engaging the drum part 7. The remote or working faces of the disks 12 and 14 preferably carry suitable brake linings 15, and said disks, while slidable to and from each other, are restrained from relative rotation, by a plurality of pins 16 engaged in registered openings formed in the outer portions of said disks and free in said openings of one of the disks.

Between the sleeves 10 and 13 is rotatively mounted a third sleeve 17 having reverse screw-threaded engagement with the sleeves 10 and 13. That is to say, the sleeve 17 has internal right-hand threads engaging corresponding threads upon the sleeve 10, and external left-hand threads engaging corresponding threads on the sleeve 13, or vice versa.

Exteriorly of the drum 7 and 8 the sleeve 17 is formed with an annular flange 18 to which is rigidly secured, as by a bolt 19, an upstanding actuating lever 20. The sleeve 17 and said lever are limited to a slight axial shifting by a ring 21 screw-threaded on the housing 2 as indicated at 22, and formed with an annular rib 23 engaged between the sleeve 17 and inner end of said lever. A lock nut 24, also engaging the screw threads 22, is clamped against the inner end of the ring 21 to prevent shifting of the latter in one direction, and the other end of said ring bears against the splines 11 to hold it against reverse shifting.

In the operation of the described brake, when the lever 20 is forwardly actuated, rocking the sleeve 17, the latter, through its screw threads, acts on the sleeves 10 and 13 to shift the disks 12 and 14 apart and into braking contact with the drum. The disk 12 being held from rotation by the splines 11 and the disk 14 being prevented by the pins 16 from turning relative to the disk 12, a retarding action will necessarily be exerted upon the drum and wheel under such conditions.

When the lever 20 is rearwardly rocked, the sleeves 10 and 13 are reversely actuated, returning the disks 12 and 14 to their normal positions illustrated in Fig. 1.

The described mechanism, although of quite simple construction, exerts a powerful braking force responsive to a comparatively slight manual effort.

It is to be noted that the lateral thrusts of the two braking members upon the drum are automatically equalized by the described construction, since the sleeve 17 has (see Fig. 1) sufficient clearance from the rib 23 to allow it such axial movement as may be required to allow both disks 12 and 14 to engage the drum before the braking stress is applied.

While it will be apparent that the illustrated embodiment of my invention herein disclosed is well calculated to adequately fulfill the objects and advantages primarily stated, it is to be understood that the invention is susceptible to variation, modification and change within the spirit and scope of the subjoined claims.

What I claim is:

1. A brake comprising a rotative member, a disk element mounted fast upon said member coaxially therewith, a second disk element coaxial with and slidable to and from said member, means restraining said sliding element from rotation, a screw-threaded member carried by and coaxial with said sliding element, a second screw-threaded member engaging the threads of the first mentioned threaded member, means comprising a groove enclosing a flange for substantially restraining the second threaded member from axial shifting, and means for rocking the second threaded member, said restraining means being threadedly adjustable.

2. A brake comprising a rotative member, a disk element rotative with said rotative member, a second disk element slidable to and from the first mentioned disk element, a pair of sleeves coaxial with said disk elements having interengaged screw-threads, one of said sleeves being carried by said sliding disk element, means substantially restraining the other of said sleeves from sliding travel in both axial directions arranged at one end of the sleeve, and means for rotatively actuating the last mentioned sleeve, said restraining means being axially adjustable.

3. A brake comprising a rotative member, a pair of spaced disk elements rotative with said member, a second pair of disk elements coacting respectively with the disk elements of the first pair, a pair of spaced screw-threaded sleeves, one carried by each of the disk elements of the second pair, a third sleeve engaged between the two first mentioned sleeves and having reversely threaded inner and outer faces engaging the threads of the first mentioned sleeves, means substantially restraining the third sleeve from axial movement, and means for rocking said third sleeve.

4. A brake comprising a rotative member, a pair of spaced disk elements rotative with said member, a second pair of disk elements mounted between the elements of the first pair and coacting therewith, a pair of spaced sleeves carried respectively by the disks of the second mentioned pair and formed with reverse screw-threads, a third sleeve mounted between and engaging the threads of said spaced sleeves, means substantially restraining said third sleeve from axial shifting, and means for rocking said third sleeve.

5. A brake comprising a rotative member, means carried by said member providing two reverse disk braking faces, a pair of disk elements slidably coacting with said faces, a pair of coaxial spaced sleeves carried respectively by said disk elements, and reversely screw-threaded, means engaging the innermost of said sleeves to restrain it and the disk carried thereby from rotation, means connecting said disks affording them relative sliding and restraining them from relative rotation, a third sleeve mounted between and engaging the threads of said spaced sleeves, means substantially restraining the third sleeve from axial shifting, and means for rocking said third sleeve.

6. In a brake, the combination with an axle housing and a live axle in said housing, of a wheel mounted upon said axle, a brake disk carried by said wheel, a coacting brake disk, means splining the last mentioned disk for sliding travel on said housing, a threaded sleeve carried by said sliding disk surrounding said housing, a second sleeve threaded to engage the first mentioned sleeve, a member adjustable upon said housing substantially restraining said second sleeve from axial shifting in either direction, and means for rocking said second sleeve.

7. A brake comprising a rotative member, means carried by said member providing two reverse disk braking faces, a pair of disk elements respectively engageable with said faces and axially shiftable together to balance the pressures of said faces, means for preventing said elements from rotation, and lever-operated means axially shiftable with said elements for engaging said elements with said faces under equalized pressures.

8. A brake comprising a rotative member, a pair of spaced disk elements rotative with said member, a second pair of disk elements disposed between and coacting respectively with the elements of the first pair, means restraining the second pair of elements from rotation, and intermeshing threaded means independent of said rotative member for engaging the disk elements of the second pair with those of the first pair under oppositely-directed pressures.

9. A brake comprising a rotatable disk, a non-rotatable disk having an axial extension, a rotatably supported internally and externally threaded sleeve operating member with which said extension has threaded engagement and which is thereby coupled with said axial extension to urge the non-rotatable disk into braking engagement with the rotatable disk upon rotation of the operating member.

10. A brake comprising a brake drum, non-rotatable brake disks arranged within the drum to be urged into braking engagement therewith, said disks having concentric radially spaced apart axial extensions, a rotatable operating member disposed between said extensions coupled therewith to actuate said disks to spread them apart into braking engagement with the drum upon rotation of the operating member.

11. A brake comprising a brake drum, retarding means arranged therein to be urged into braking engagement therewith and having an annular portion disposed axially of the drum, an operating member having a limited axial movement and coaxial with respect to said portion and screw-threadedly engaging the outer surface of said annular portion to urge the retarding means into braking engagement with the drum said operating member having an angular movement limited by the brake applied and release positions.

12. Brake mechanism comprising a brake drum, friction means arranged therein to be urged thereagainst to retard the rotation of the drum and having an annular portion extending axially of the drum, an operating member having a limited axial movement and encircling said annular portion coupled therewith to move the friction means into engagement with the drum upon a determined rotation of the operating member.

13. A brake including a non-rotatable part, a rotatable part, a plurality of annular braking elements associated respectively with the parts, the elements associated with the non-rotatable part having telescopic flanges, said non-rotatable elements being keyed together independent of said flanges, and means cooperating on said flanges for effecting movement of certain of the braking elements axially of the assembly into frictional engagement with other of the braking elements to brake the rotatable part.

14. A brake, including a non-rotatable part, a plurality of braking elements associated therewith, a rotatable part, a plurality of braking elements associated therewith, one of said sets of elements having telescopic central flanges and being keyed together independent of said flanges, and means acting on said flanges for effecting movement of the braking elements of one of the sets apart axially of the assembly into frictional engagement with the braking elements of the other of the sets to brake the rotatable part.

15. A brake, including a non-rotatable part having in association therewith parallel friction members having telescopic central tubular flanges and movable axially of the assembly and keyed together independent of said flanges, a rotatable part having in association therewith parallel friction members adapted to be engaged by the first mentioned surfaces to brake the rotatable part, and means acting on said flanges to move the first mentioned members away from each other into such engagement.

16. A brake comprising respectively interiorly and exteriorly threaded friction brake members, and an operating member having both internal and external threads meshing therewith.

17. A brake comprising a pair of brake members having telescoping sleeves keyed together independently of said sleeves to prevent relative rotation in a manner permitting relative axial movement.

18. A brake comprising a pair of disc brake members keyed together back to back to prevent relative rotation in a manner permitting relative axial movement by pins seated in alined cup-shaped recesses in the backs of said members, and means independent of said pins for restraining one of said disks from rotation.

19. A rotatable brake member and an operating part therefor, in combination with a part having a flange embraced between said member and part and restraining axial movement thereof.

20. A rotatable annular brake operating member having internal and external threads of substantially the same pitch.

21. A brake comprising a pair of brake members and an operating member having three interfitting sleeves.

22. A brake disk having a friction lining on one face having a central interiorly-threaded sleeve and means adjacent the outer periphery and on the reverse side from the friction lining for securing said disk against rotation.

23. A pair of brake disks having central sleeves one surrounding the other in spaced relation.

24. A pair of floating brake disks keyed together to prevent relative rotation and having sleeves one surrounding the other.

EDWIN FRANKLAND.